United States Patent
Lee

(10) Patent No.: US 12,425,607 B2
(45) Date of Patent: Sep. 23, 2025

(54) RESERVED BIT PREDICTION FOR SLICE SIZE CONTROL WITH PIPELINED VIDEO ENCODING

(71) Applicant: Sony Interactive Entertainment Inc., Tokyo (JP)

(72) Inventor: Hung-Ju Lee, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 308 days.

(21) Appl. No.: 18/180,788

(22) Filed: Mar. 8, 2023

(65) Prior Publication Data
US 2024/0305790 A1    Sep. 12, 2024

(51) Int. Cl.
   *H04N 19/149*    (2014.01)
   *H04N 19/169*    (2014.01)
   *H04N 19/184*    (2014.01)

(52) U.S. Cl.
   CPC ......... *H04N 19/149* (2014.11); *H04N 19/184* (2014.11); *H04N 19/188* (2014.11)

(58) Field of Classification Search
   CPC ... H04N 19/149; H04N 19/184; H04N 19/188
   See application file for complete search history.

(56) References Cited

U.S. PATENT DOCUMENTS

| | | | | |
|---|---|---|---|---|
| 6,664,913 | B1 * | 12/2003 | Craven | H03M 7/3046 375/243 |
| 2008/0253448 | A1 * | 10/2008 | Lin | H04N 19/436 375/240.03 |
| 2009/0252227 | A1 | 10/2009 | NepomucenoLeung et al. | |
| 2009/0324108 | A1 * | 12/2009 | Yan | H04N 19/436 382/232 |
| 2011/0090960 | A1 | 4/2011 | Leontaris et al. | |
| 2013/0128949 | A1 * | 5/2013 | Sezer | H04N 19/149 375/E7.126 |
| 2013/0300940 | A1 * | 11/2013 | Amon | H04N 19/87 348/700 |
| 2017/0295368 | A1 | 10/2017 | Teng et al. | |
| 2017/0308996 | A1 | 10/2017 | Kadu et al. | |
| 2019/0007680 | A1 * | 1/2019 | Chen | H04N 19/15 |
| 2022/0368914 | A1 * | 11/2022 | Misra | H04N 19/44 |

OTHER PUBLICATIONS

"International Search Report and Written Opinion", dated Apr. 17, 2024, from the counterpart PCT application PCT/US24/11339.

* cited by examiner

*Primary Examiner* — Jeremiah C Hallenbeck-Huber
(74) *Attorney, Agent, or Firm* — Kilpatrick Townsend & Stockton LLP

(57) ABSTRACT

A technique to determine an optimum number of reserved bits for use in video encoding. The bits per coding unit is calculated as a function of bitrate, frame rate and frame size. Then for each coding unit, N reserved bits candidates are selected. For each test video the number of packets per frame is identified and the average number of packets per frame is calculated. The best reserved bits candidate out of the N reserved bits candidates is identified, and then a best fitted linear model between best reserved bits candidate and bits per coding unit is determined.

16 Claims, 10 Drawing Sheets

|  | 702 | 704 |  |  | 706 | 700 |
| --- | --- | --- | --- | --- | --- | --- |
|  | Bitrate | Framerate | Width | Height | #CTB | BitsPerCTB |
|  | 2 | 60 | 1280 | 720 | 240 | 138.89 |
|  | 4 | 60 | 1280 | 720 | 240 | 277.78 |
|  | 6 | 60 | 1280 | 720 | 240 | 416.67 |
|  | 8 | 60 | 1280 | 720 | 240 | 555.56 |
|  | 10 | 60 | 1280 | 720 | 240 | 694.44 |
|  | 12 | 60 | 1280 | 720 | 240 | 833.33 |
|  | 8 | 60 | 1920 | 1080 | 510 | 261.44 |
|  | 10 | 60 | 1920 | 1080 | 510 | 326.80 |
|  | 12 | 60 | 1920 | 1080 | 510 | 392.16 |
|  | 15 | 60 | 1920 | 1080 | 510 | 490.20 |
|  | 18 | 60 | 1920 | 1080 | 510 | 588.24 |
|  | 20 | 60 | 1920 | 1080 | 510 | 653.59 |
|  | 20 | 60 | 3840 | 2160 | 2040 | 163.40 |
|  | 24 | 60 | 3840 | 2160 | 2040 | 196.08 |
|  | 28 | 60 | 3840 | 2160 | 2040 | 228.76 |
|  | 32 | 60 | 3840 | 2160 | 2040 | 261.44 |
|  | 36 | 60 | 3840 | 2160 | 2040 | 294.12 |
|  | 40 | 60 | 3840 | 2160 | 2040 | 326.80 |
|  | 44 | 60 | 3840 | 2160 | 2040 | 359.48 |

FIG. 7

| Bitrate | BitsPerCTB | MaxSliceSize (4MTU) | Reserved Bits | Avg#Packets/Frame | | | | |
|---|---|---|---|---|---|---|---|---|
| | | | | FF15-Sunrise | GTSport-Circuit | GTSport-Opening | Resogun-Decima | Average |
| 20 | 163.40 | 44736 | 1000 | 30.70 | 30.90 | 30.20 | 30.80 | 30.65 |
| 20 | 163.40 | 44736 | 2000 | 29.60 | 29.30 | 29.00 | 29.40 | 29.33 |
| 20 | 163.40 | 44736 | 3000 | 29.50 | 29.10 | 29.00 | 29.10 | 29.18 |
| 20 | 163.40 | 44736 | 4000 | 29.70 | 29.50 | 29.60 | 29.40 | 29.55 |
| 20 | 163.40 | 44736 | 5000 | 30.10 | 30.10 | 30.00 | 30.00 | 30.05 |
| 20 | 163.40 | 44736 | 6000 | 30.50 | 30.60 | 30.60 | 30.50 | 30.55 |
| 20 | 163.40 | 44736 | 7000 | 31.10 | 31.20 | 31.30 | 31.20 | 31.20 |
| 20 | 163.40 | 44736 | 8000 | 31.70 | 31.90 | 32.10 | 31.90 | 31.90 |
| 20 | 163.40 | 44736 | 9000 | 32.40 | 32.80 | 33.00 | 32.80 | 32.75 |
| 20 | 163.40 | 44736 | 10000 | 33.10 | 33.80 | 33.70 | 33.60 | 33.55 |

FIG. 8

| BR | FR | Width | Height | #CTB | BitsPerCTB | Best Reserved Bits |
|---|---|---|---|---|---|---|
| 2 | 60 | 1280 | 720 | 240 | 138.89 | 1000 |
| 4 | 60 | 1280 | 720 | 240 | 227.78 | 4000 |
| 6 | 60 | 1280 | 720 | 240 | 416.67 | 4000 |
| 8 | 60 | 1280 | 720 | 240 | 555.56 | 6000 |
| 10 | 60 | 1280 | 720 | 240 | 694.44 | 6000 |
| 12 | 60 | 1280 | 720 | 240 | 833.33 | 8000 |
| 8 | 60 | 1920 | 1080 | 510 | 261.44 | 4000 |
| 10 | 60 | 1920 | 1080 | 510 | 326.80 | 4000 |
| 12 | 60 | 1920 | 1080 | 510 | 392.16 | 4000 |
| 15 | 60 | 1920 | 1080 | 510 | 490.20 | 4000 |
| 18 | 60 | 1920 | 1080 | 510 | 588.24 | 6000 |
| 20 | 60 | 1920 | 1080 | 510 | 653.59 | 6000 |
| 20 | 60 | 3840 | 2160 | 2040 | 163.40 | 3000 |
| 24 | 60 | 3840 | 2160 | 2040 | 196.08 | 3000 |
| 28 | 60 | 3840 | 2160 | 2040 | 228.76 | 3000 |
| 32 | 60 | 3840 | 2160 | 2040 | 261.44 | 3000 |
| 36 | 60 | 3840 | 2160 | 2040 | 294.12 | 4000 |
| 40 | 60 | 3840 | 2160 | 2040 | 326.80 | 4000 |
| 44 | 60 | 3840 | 2160 | 2040 | 359.48 | 3000 |

| Bitrate | Resolution | BitsPerCTB | Reserved Bits | Avg #Packets / Frame | Avg Packet Overhead%* |
|---|---|---|---|---|---|
| 20 | 3840x2160 | 163.40 | 2544 | 29.39 | 6.00% |
| 24 | 3840x2160 | 196.08 | 2789 | 35.18 | 6.43% |
| 28 | 3840x2160 | 228.76 | 3034 | 40.95 | 6.81% |
| 32 | 3840x2160 | 261.44 | 3280 | 46.76 | 6.89% |
| 36 | 3840x2160 | 294.12 | 3525 | 52.49 | 7.17% |
| 40 | 3840x2160 | 326.80 | 3770 | 58.15 | 7.66% |
| 8 | 1920x1080 | 359.48 | 3280 | 9.37 | 6.66% |
| 10 | 1920x1080 | 326.80 | 3770 | 11.14 | 7.27% |
| 12 | 1920x1080 | 392.16 | 4261 | 12.79 | 8.21% |
| 15 | 1920x1080 | 490.20 | 4997 | 15.18 | 8.58% |
| 18 | 1920x1080 | 588.24 | 5732 | 17.48 | 10.01% |
| 20 | 1920x1080 | 653.59 | 6223 | 18.93 | 10.09% |
| 2 | 1280x720 | 138.89 | 2360 | 2.61 | 0.38% |
| 4 | 1280x720 | 277.78 | 3402 | 4.53 | 5.11% |
| 6 | 1280x720 | 416.67 | 4445 | 6.00 | 6.48% |
| 8 | 1280x720 | 555.56 | 5487 | 7.33 | 7.95% |
| 10 | 1280x720 | 694.44 | 6529 | 8.68 | 9.05% |
| 12 | 1280x720 | 833.33 | 7572 | 10.00 | 10.38% |

RESERVED BIT PREDICTION FOR SLICE SIZE CONTROL WITH PIPELINED VIDEO ENCODING

FIELD

The present application relates generally to techniques for reserved bit prediction for slice size control with pipelined video encoding.

BACKGROUND

As understood by present principles, in video encoding, a slice size control may be used to control the size of encoded bits in a slice (portion) of video. The slice size should match the payload size of network packet to efficiently use network bandwidth and ease packet loss recovery if each packet starts with a slice header.

As further understood by present principles, for a multi-stage pipelined video encoder, slice size control may encounter a situation where some coding units (e.g., a macroblock in H.264/AVC or coding tree block (CTB) in H.265/High Efficiency Video Coding) are not properly counted in slice size calculation due to the pipelined encoding delay.

SUMMARY

With the above recognitions in mind, an improved prediction of the encoding size for those coding units is needed to improve the overall slice size control efficiency. Otherwise, extra and unwanted slices can be generated, and in turn extra and unwanted network packets can be generated to potentially congest networks and degrade coding efficiency. Present principles provide techniques to overcome the aforementioned deficiency by rendering a proper estimate of reserved bits for those in-pipeline coding units.

In more detail, the ultimate goal for a slice size control is to minimize the number of packets for a frame to be sent out over networks, within constraints described herein. If no slice size control at all is present the number of packets for a frame will be minimized, but the drawback of this is that any packet loss may cause significant visual quality degradation in the receiving side because the decoder process is disrupted for missing slice bits associated with the lost packets. To tradeoff between the number of packets and error recovery capability, a proper slice size control with a header insertion is needed, so that any missing slice associated with packet loss will only locally affect the current slice, and the following slices can be still contentiously decoded without interruption due to a slice header. At the same time, it is desired that slice control pack as many as possible coded bits (i.e., as close to the max_slice_size as possible), so that the slice efficiency is high and the number of packets to be transmitted is concomitantly minimized.

Accordingly, a system includes at least one computer medium that is not a transitory signal and that in turn includes instructions executable by at least one processor to determine an optimum number of reserved bits for use in video encoding. This is done at least in part by calculating bits per coding unit as a function of bitrate, frame rate and frame size, and for each coding unit, identifying N reserved bits candidates. For each test video, the instructions are executable to identify a number of packets per frame and calculate an average number of packets per frame. The instructions also are executable to identify a first one of the reserved bits candidate out of the N reserved bits candidates, determine a fitted function between respective first reserved bits candidates and respective bits per coding unit, and using the fitted function, encode video.

The fitted function may include one or more of a linear function, a logarithmic function, or a polynomial function.

In non-limiting examples the instructions are executable to encode video at least in part by identifying a reserved bits estimate using the fitted function to identify a location in the video to insert a slice header. Example instructions can be further executable to insert a slice header in the video at the location, and provide the video to at least one player of video.

In another aspect, a method includes generating a model representing a correlation between bits per coding unit in at least one video and respective estimates of reserved bits. The method includes determining, for at least one slice of the video, a slice size based at least in part on an estimate of reserved bits obtained from the model, and using the slice size, inserting a slice header in the video.

In another aspect, an apparatus includes at least one processor programmed to identify N reserved bit candidates, in which N is an integer greater than one and the reserved bit candidates each represent a respective number of bits. The processor also is programmed to, for each of plural test videos, identify a number of bits per coding unit and an average number of data units (such as packets, for example) per frame, and for each of the plural test videos, identify from among the N reserved bit candidates a first reserved bit candidate that results in the smallest average number of data units per frame compared to the average number that result from the other candidates. The processor is programmed to generate a model using pairs of respective first reserved bit candidates and respective bits per coding units, and use the model to encode video.

The details of the present application, both as to its structure and operation, can be best understood in reference to the accompanying drawings, in which like reference numerals refer to like parts, and in which:

BRIEF DESCRIPTION OF THE DRAWINGS

FIGS. 7-9 illustrate tables demonstrating a specific example of FIG. 6; and

FIG. 11 illustrates a data structure correlating parameters.

DETAILED DESCRIPTION

Figure 1:
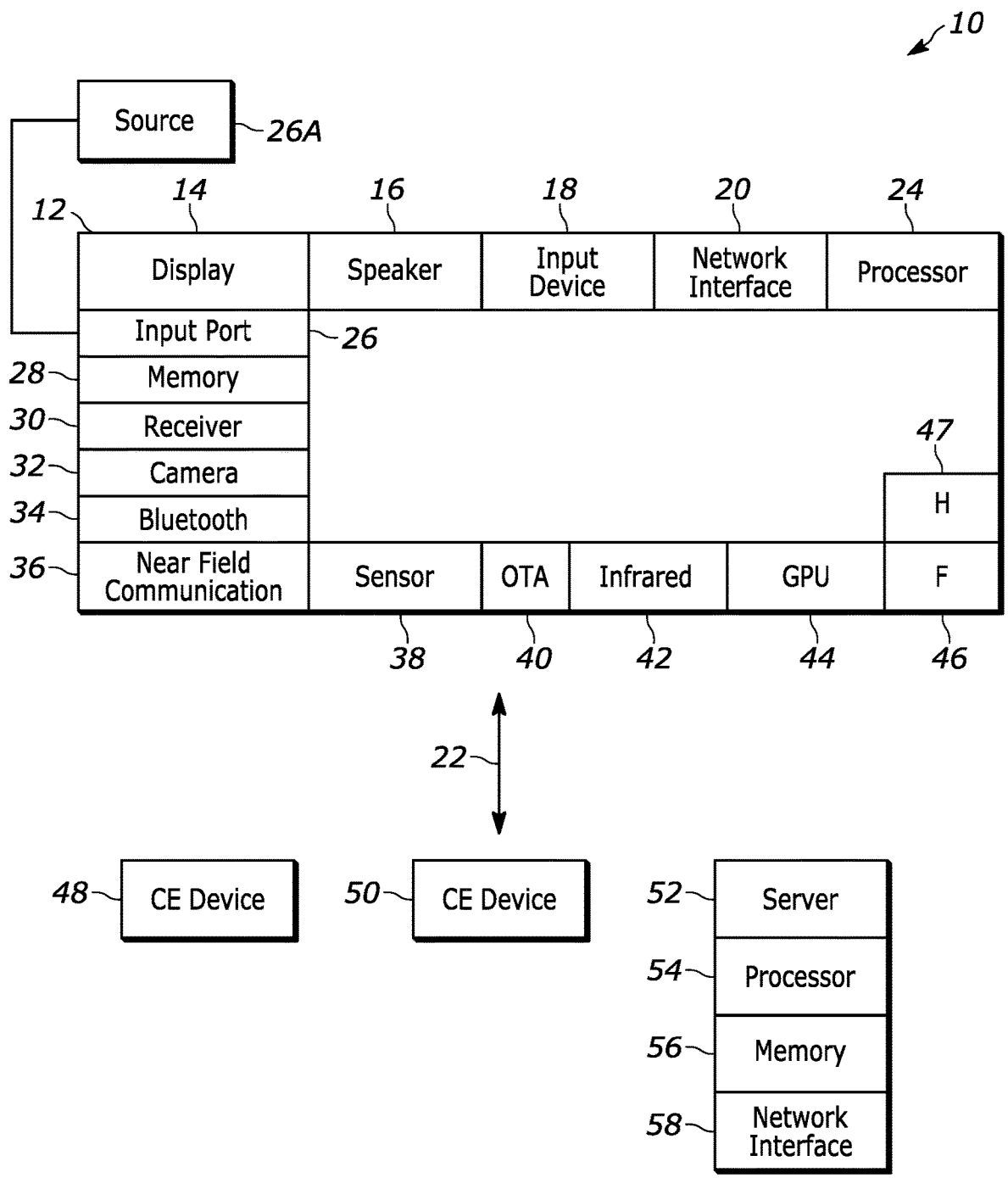
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
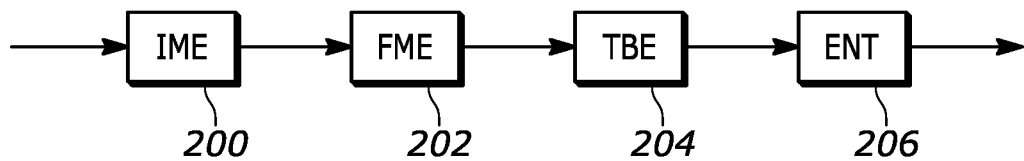
FIG. 2 illustrates a general four stage video encoding pipeline.
Figure 3:
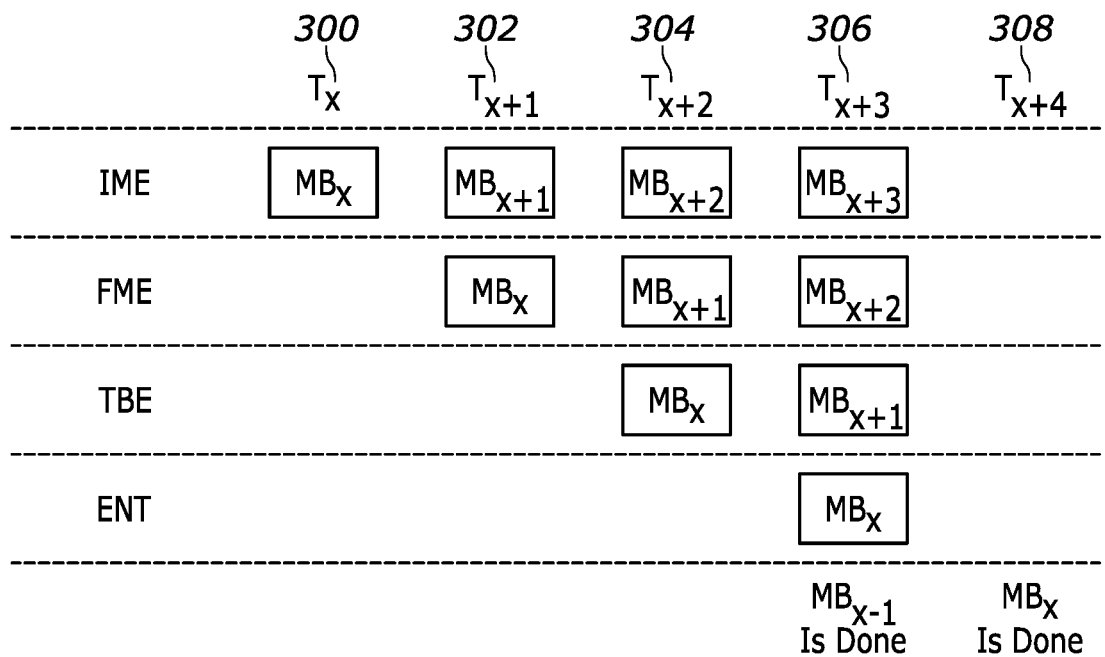
FIG. 3 illustrates a timing chart for the pipeline shown in FIG. 2.
Figure 4:
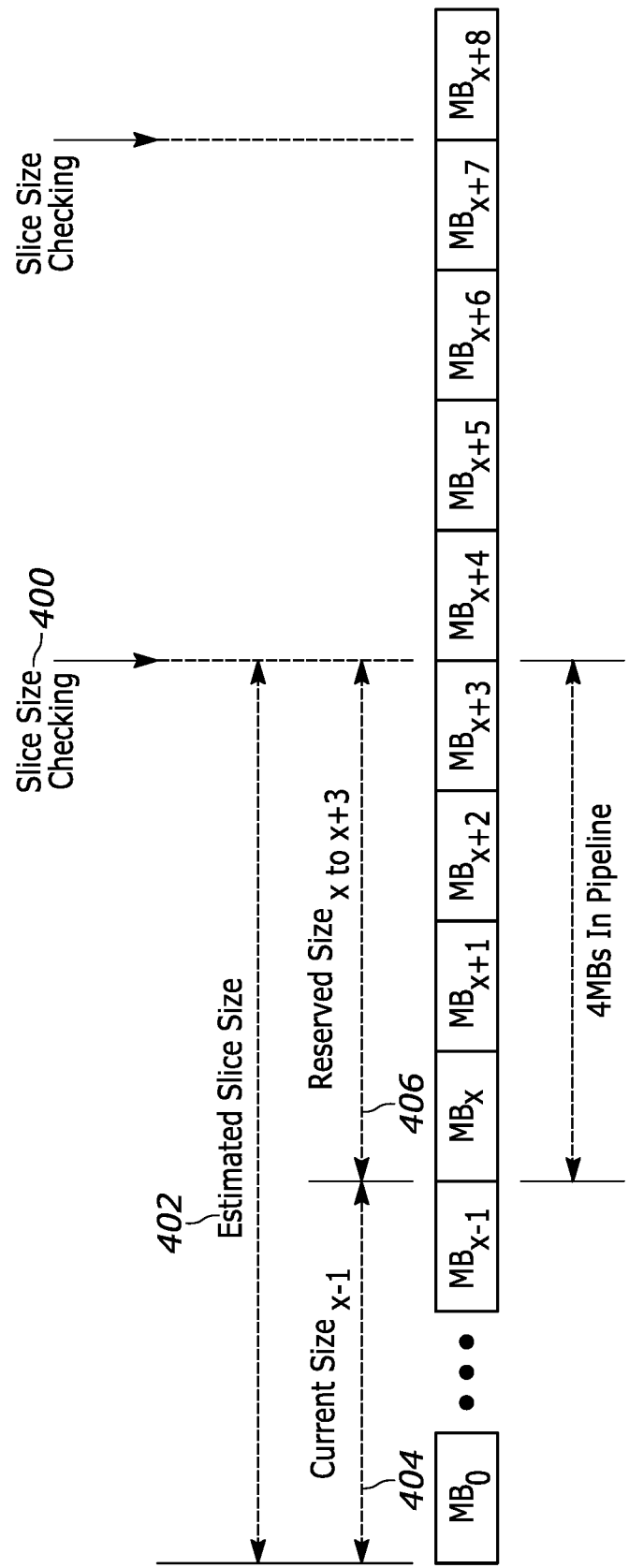
FIG. 4 illustrates slice-based encoding.

FIGS. 2-4 provide insight into the environment of present techniques. FIG. 2 shows a generalized multi-stage pipelined architecture with four main hardware blocks that may be implemented by a video encoder: Integer Motion Estimation (IME) 200, Fractional ME (FME) 202, Transform, Quantize and Mode Decision (TBE) 204, and Entropy (ENT) 204. To compress a video frame, a basic coding unit (e.g., a macroblock in H.264 or Coding Tree Block (CTB) in H.265) goes through a series of encoding hardware blocks. After the coding unit completes the ENT 204, its final bit count for a coding unit is determined.

FIG. 3 shows a complete encoding process for a coding unit, in the example shown, using a macroblock (MB) as a specific non-limiting example coding unit. At time $T_x$ 300 in FIG. 3, a first coding unit $MB_x$ enters the pipeline at the IME stage 200 in FIG. 2. At the next time step $T_{x+1}$ 300, the coding unit ($MB_{x+1}$) immediately following the first coding unit $MB_x$ enters the stage IME 200, and the first coding unit $MB_x$ is advanced to the next stage FME 202. At the next time step $T_{x+2}$ 304, yet a new (third) coding unit ($MB_{x+2}$) enters the stage IME 200, and the second coding unit $MB_{x+1}$ and first coding unit $MB_x$ advance respectively to the FME 202 and TBE 204 stages. At the next time step time $T_{x+3}$ 306, another new coding unit $MB_{x+3}$ enters the IME 200 stage, the third coding unit $MB_{x+2}$ is at the FME stage 202, the second coding unit $MB_{x+1}$ is at the TBE stage 204, and the initial coding unit $MB_x$ is at the ENT stage 206. At the final time step $T_{x+4}$ 308 shown in FIG. 3, the first coding unit $MB_x$ exits the pipeline, and its actual bit count is then determined. Each succeeding coding unit likewise is processed through the pipeline.

For a slice-based video encode, a slice header can be inserted at the point where the accumulated bitstream size exceeds the pre-defined threshold (i.e., maximum slice size). An encoder inserts a slice header if it detects the accumulated encoded size exceeding the pre-determined maximum slice size. While calculating the accumulated slice size, the encoder considers those coding units such as macroblocks which are processed in the pipeline, because it is not allowed to insert any header at any coding unit in the pipeline.

FIG. 4 provides illustration of this in terms of the four stage pipeline in FIG. 2, in which the encoder checks at 400 a predicted slice size 402 (also referred to in the figures as "estimated slice size") at every four coding units (such as MBs). The predicted slice size is the sum of a current slice size 404 up to a coding $MB_{x-1}$ as shown, plus an estimated reserved size 406 of four coding units (such as MBs) from a coding unit $MB_x$ through three more coding units ending at $MB_{x+3}$. At the next coding unit $MB_{x+4}$ (before it enters the pipeline), the encoder compares the "predicted slice size" (or estimated slice size) with the maximum slice size and a new slice header is inserted if the estimated slice size is greater than the maximum slice size max_slice_size. Similarly, the next slice size checking is performed four coding units later, at $MB_{x+8}$.

Figure 5:
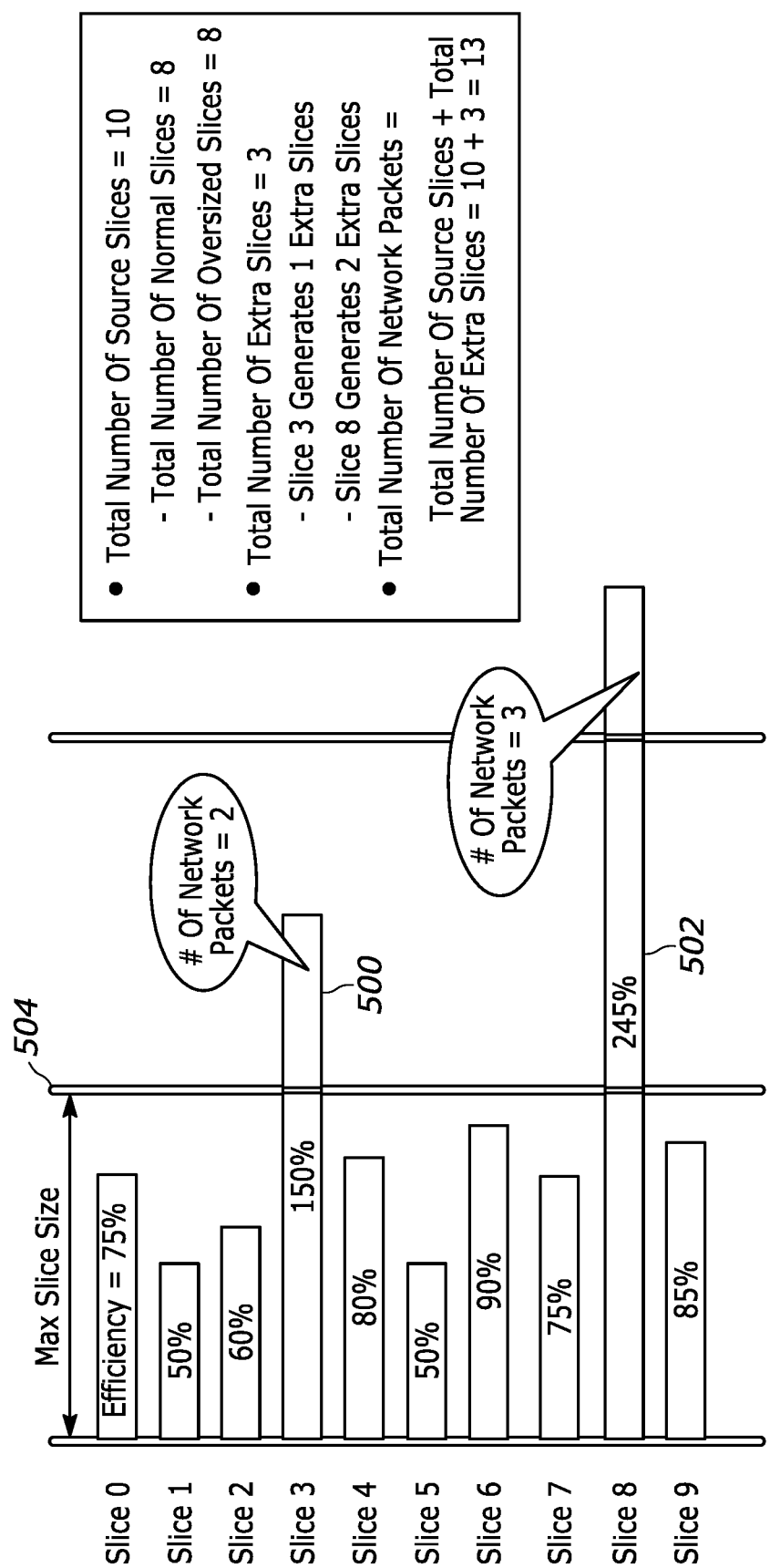
FIG. 5 illustrates an example of slice size control.

FIG. 5 illustrates one further facet of the environment in which present principles may be used relating to predication accuracy resulting in an oversized slice (in the example shown, slices 500 and 502). An oversized slice is defined as one having a size greater than the maximum permissible slice size 504. An oversized slice results in low slice efficiency and increases the total number of packets because an oversized slice creates more than one packet, resulting in worse slice size control efficiency. To have a better slice efficiency or reduce oversized slices, reserved bits need to be properly determined. A too-large reserved bits estimation may waste unused slice bit in a slice, resulting in a low slice efficiency, while a too-small reserved bits estimation may increase the possibility of oversized slices, resulting in multiple unwanted slices are needed, increasing the number of packets.

With this environment in mind, present principles provide a systematic approach to derive a linear estimation reserved bits model to estimate the reserved size 406 shown in FIG. 4 for various bitrate and frame rate coding configurations. A description of an evaluation of model efficiency is also divulged.

Turn now to FIG. 6 and the equivalent pseudo-code shown below, in which, to facilitate discussion on how present techniques derive a reserved bits formula, the high efficiency video coding (HEVC) standard is used as a non-limiting example. In HEVC, the basic coding unit is known as a CTB (Coding Tree Block), and the maximum size of one CTB is 4 MBs*4 MBs. The number of CTBs in a frame is calculated as round_up (frame width/64) *round_up (frame_height/64).

Figure 6:
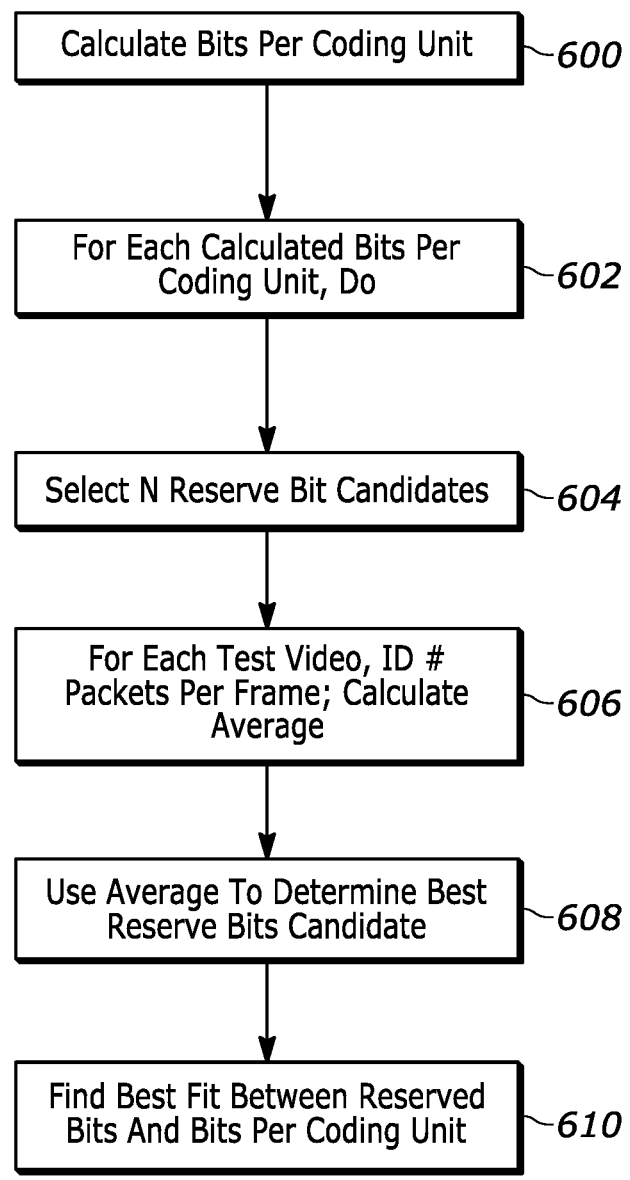
FIG. 6 illustrates example logic in example flow chart format consistent with present principles.

With this in mind, commencing at block 600 in FIG. 6, a bits per coding unit (in the pseudocode, BitsPerCTB) is calculated as a function of bitrate, frame rate, and frame size (e.g., in terms of number of coding units contained) of the video being encoded. In a specific example, bits per coding unit is obtained by dividing the bitrate by the product of the frame rate and coding units per frame. Plural test videos may be used each with different parameters, so a BitsPerCTB is calculated for each.

Proceeding to block 602, for each calculated BitsPerCTB (for each calculated bits per coding unit for the plural videos), a DO loop is entered in which, at block 604, N reserve bit candidates is selected, N being an integer greater than one. Also in the DO loop, at block 606 for each test video the number of packets per frame is identified and an average number of packets per frame is calculated.

The DO loop of the logic next moves to block 608 to use the average number of bits from block 606 to determine a best reserve bits candidate from among the N reserve bits candidates from block 604. This ends the DO loop. Exiting the DO loop, the logic ends at block 610 by finding a best fit curve (such as a linear model but other fits such as a polynomial or logarithmic fit) to establish a predicted reserve bit number for encoding.

Pseudocode:
1. Calculate BitsPerCTB=func (bitrate, frame rate and frame size), and
   a. BitsPerCTB=bitrate/{frame rate*#CTBs in a frame}
2. For each BitsPerCTB
   a. Select N reserved bits candidates
   b. For each test video
      i. Find out the number of packets per frame
      ii. Calculate the average number of packers per frame
   c. Find out the best reserved bits candidate out of the N reserved bits candidates
3. Find a best fitted linear model between ReservedBits and BitsPerCTB Turn to the table of FIG. 7 for an example of implementing the algorithm above. Four test videos with three different resolutions are selected, with each having six different bitrates. Also, N=10 different reserved bits candidates are selected. Note that the more different reserved bits candidates lead to a more reliable model to predict the reserved bits statistically. For simplicity, N=10 is used. The three resolutions each with six bitrates are 2160p@60 fps: 40,36, 32,28,24,20 Mbps, 1080p@60 fps: 8,10,12,15,18,20 Mbps, and 720p@60 fps: 2,4,6,8,10,12 Mbps. Ten different reserved bits candidates are used, namely, I/PSliceReservedBits: [1000, 2000, . . . , 10000] with delta=1000.

As shown in the last column 700 of FIG. 7, BitsPerCTB for each test video/resolution/bitrate is calculated as a function of (Bitrate 702/Frame Rate 704/# of coding units (e.g., CTBs in the example shown) 706 per frame). It is to be noted that the numbers in column 702 for bitrate represent megabits. In FIG. 7, there are eighteen different values of BitsPerCTB. Taking BitsPerCTB=163.40 with ten different reserved bits candidates, as an example, the average number of packets per frame is calculated for each video and reserved bits candidates.

From the table of FIG. 8, the best reserved bits candidate 800 is 3000 for its smallest average packet per frame 802 (=29.18). The next step is to find best reserved bits for each BitsPerCTB, and the result is shown in FIG. 9, which is essentially the same as FIG. 7 with an added column 900 illustrating, for each video, the best reserved bits candidate.

Figure 10:
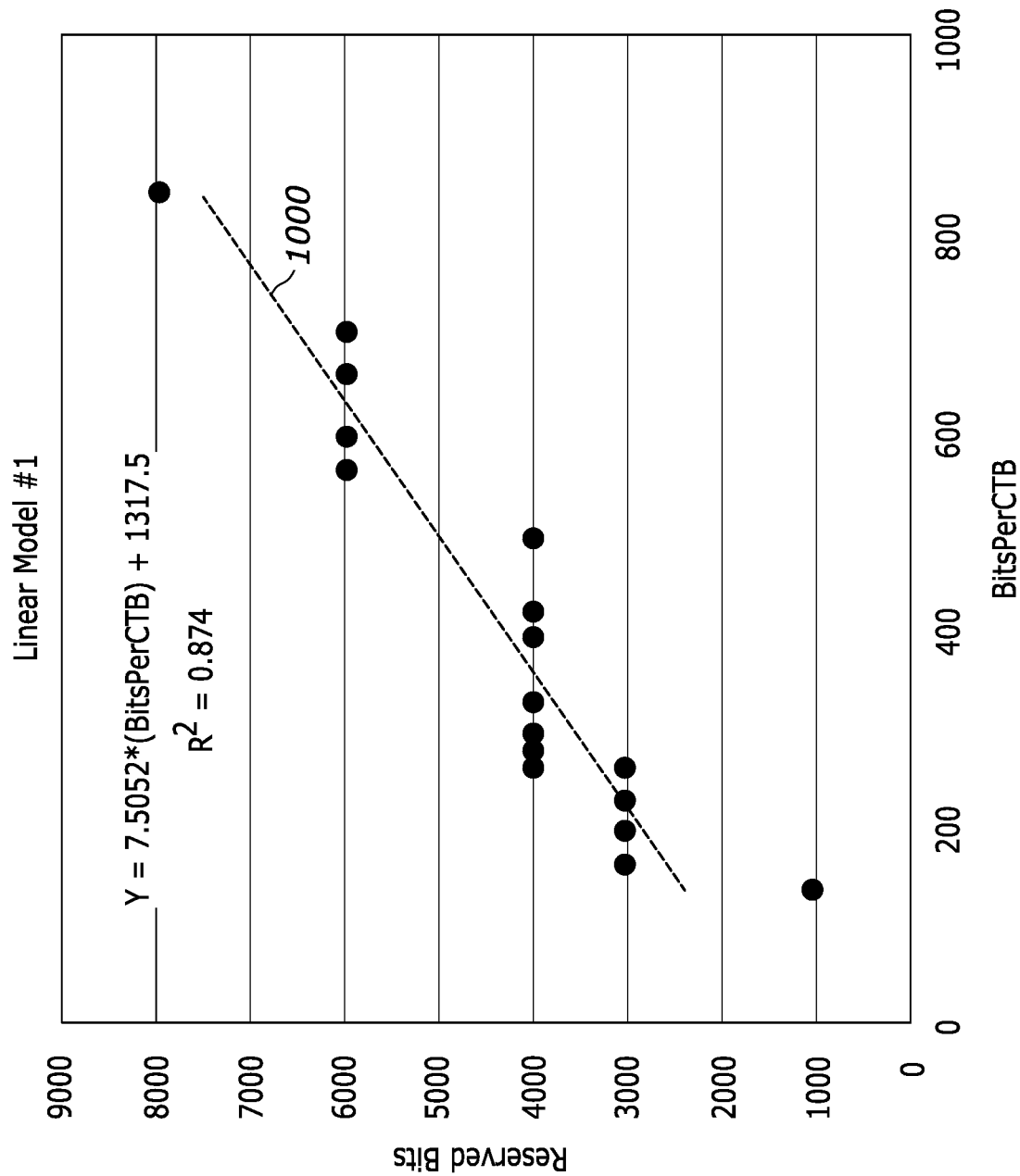
FIG. 10 illustrates a table further depicting results of implementing FIG. 6 on various test videos.

To complete the example refer to FIG. 10, in which based on the table of FIG. 9, the relationship between BitsPerCTB and Best Reserved Bits is formulated using, in the example shown, a linear model 1000 that indicates for this relationship ReservedBits=7.5052*(BitsPerCTB)+1317.5. The data points in FIG. 10 represent the two right-most columns from FIG. 9. Also note that a linear model to minimize the error is used in this example for simplicity, but as alluded to above, a more complicated model (e.g., a polynomial function with order two or more, or a logarithmical model) can be derived. Once the curve is plotted, it (e.g., in terms of the formula defining the curve) can be subsequently used to ascertain the best reserved bits estimate (the y-axis) using as entering argument the calculated bits per coding unit on the x-axis. Then, the relevant slice is encoded using the reserved bit estimate by, for instance, estimating the slice will contain one or more coding units the sizes of which are equal to the reserved bits estimate. Stated differently, the best reserved bits estimate is used to determine where to insert a new slice header by comparing the estimated slice size (including the best reserved bits estimate) to a maximum slice size threshold and inserting a new slice header if the estimated slice size is greater than the maximum slice size threshold.

One way to evaluate the effectiveness of the technique described herein is to use the average number of packets per frame. By comparing the average number of packets in the case of max slice size=n×MTU wherein MTU stands for maximum transmission unit and in one example is 1500 bytes to that in the no slice size control case (i.e., the minimum number of bits used), the packet overhead percentage can be computed to evaluate the formula performance. The packet overhead percentage is defined as Packet Overhead % = $100\% * (P_{n \times MTU} - P_{no\_ssc})/P_{no\_ssc}$, where $P_{n \times MTU}$ = average number of packets per frame for max_slice_size = $n * MTU$ and $P_{no\_ssc}$ = round_up (average frame size in NO SSC/max_slice_size)

With this in mind, the table of FIG. 11 illustrates example evaluation sets of videos to evaluate the technique herein. The set of evaluation videos includes eight 4K (3840×2160) Test Videos (total frames: 9365), twenty 2K (1920×1080) Test Videos (total frames: 15856), and twenty 1280×720 Test Videos (total frames: 15856). The average packets per frame appears in the second right-most column 1100 and the average packet overhead appears in the right-most column 1102.

While the particular embodiments are herein shown and described in detail, it is to be understood that the subject matter which is encompassed by the present invention is limited only by the claims.

What is claimed is:

1. A system comprising:
   at least one computer medium that is not a transitory signal and that comprises instructions executable by at least one processor to perform actions comprising:
   identifying N reserved bit candidates, N being an integer greater than one, the N reserved bit candidates each representing a respective number of bits;
   for each of plural test videos, identifying a number of bits per coding unit and an average number of data units per frame;
   for each of the plural test videos, identifying from among the N reserved bit candidates a first reserved bit candidate resulting in a smallest average number of data units per frame;
   generating a model using pairs of respective first reserved bit candidates and respective bits per coding units; and
   using the model to encode video.

2. The system of claim 1, comprising the at least one processor.

3. The system of claim 1, wherein the model utilizes a linear function.

4. The system of claim 1, wherein the model utilizes a logarithmic function.

5. The system of claim 1, wherein the model utilizes a polynomial function.

6. The system of claim 1, wherein the instructions are further executable by at least one processor to perform actions comprising:
   encode the video at least in part by identifying a reserved bits estimate using the model to identify a location in the video to insert a slice header.

7. The system of claim 6, wherein the instructions are executable to:
   insert a slice header in the video at the location; and
   provide the video to at least one player of video.

8. A method, comprising:
   identifying N reserved bit candidates, N being an integer greater than one, the N reserved bit candidates each representing a respective number of bits;
   for each of plural test videos, identifying a number of bits per coding unit and an average number of data units per frame;
   for each of the plural test videos, identifying from among the N reserved bit candidates a first reserved bit candidate resulting in a smallest average number of data units per frame;
   generating a model using pairs of respective first reserved bit candidates and respective bits per coding units; and
   using the model to encode video.

9. The method of claim 8, wherein the model comprises a linear model.

10. The method of claim 8, wherein the model comprises a logarithmic model.

11. The method of claim 8, wherein the model comprises a polynomial model.

12. An apparatus comprising:
    at least one processor programmed to:
    identify N reserved bit candidates, N being an integer greater than one, the N reserved bit candidates each representing a respective number of bits;
    for each of plural test videos, identify a number of bits per coding unit and an average number of data units per frame;
    for each of the plural test videos, identify from among the N reserved bit candidates a first reserved bit candidate resulting in a smallest average number of data units per frame;
    generate a model using pairs of respective first reserved bit candidates and respective bits per coding units; and
    use the model to encode video.

13. The apparatus of claim 12, wherein the number of bits per coding unit is a function of bitrate, frame rate, and frame size.

14. The apparatus of claim 13, wherein the data units comprise packets.

15. The apparatus of claim 12, wherein the processor is programmed to:
    determine, for at least one slice of the video, a slice size based at least in part on an estimate of reserved bits obtained from the model; and
    using the slice size, insert a slice header in the video.

16. The apparatus of claim 12, wherein the model comprises a linear model.

* * * * *